United States Patent [19]

Hanser et al.

[11] 3,924,656
[45] Dec. 9, 1975

[54] DIRECTION CONTROL VALVE HAVING FLOAT MODE

[75] Inventors: Paul Edmund Hanser, Moline, Ill.; William Lee Snyder, Dubuque, Iowa

[73] Assignee: Deere & Company, Moline, Ill.

[22] Filed: Apr. 26, 1974

[21] Appl. No.: 464,308

[52] U.S. Cl. ............... 137/596.14; 91/453; 91/454; 91/464; 137/596.16
[51] Int. Cl.² ......................................... F16K 11/04
[58] Field of Search .......... 137/596, 596.12, 596.14, 137/596.17, 596.18; 91/453, 454, 464

[56] References Cited
UNITED STATES PATENTS

| | | | |
|---|---|---|---|
| 2,503,827 | 4/1950 | Langmore et al. | 91/464 X |
| 3,587,640 | 6/1971 | Hanser | 137/596.14 |
| 3,739,813 | 6/1973 | Worden | 91/453 X |

FOREIGN PATENTS OR APPLICATIONS

| | | | |
|---|---|---|---|
| 1,331,025 | 5/1963 | France | 137/596 |

*Primary Examiner*—Robert G. Nilson

[57] ABSTRACT

A pilot-operated direction control valve includes a valve body defining identical valve bores in which are located identical valve assemblies on which first and second poppet valve elements are mounted. The first valve element of each assembly is mounted on a respective valve stem such that movement of the first poppet valve element in a first direction will cause corresponding movement of the valve stem and the second poppet valve element to unseat the valve elements and connect a source of fluid pressure to one actuator work port while connecting another actuator work port to a reservoir. However, the mounting of each of the first poppet valve element on a respective valve stem permits the valve stem to be shifted so as to unseat the second poppet valve element without unseating the first poppet valve element so that the source of fluid pressure is blocked from the one actuator work port while the other actuator work port is connected to the reservoir. The identical valve assemblies cooperate to establish a float condition in the actuator wherein both work ports thereof are connected to the reservoir when the valve stems thereof are shifted relative to the first poppet valve elements thereof.

4 Claims, 3 Drawing Figures

DIRECTION CONTROL VALVE HAVING FLOAT MODE

BACKGROUND OF THE INVENTION

The present invention relates to a direction control valve for controlling the flow of fluid to and from opposite work ports of an extensible and retractable hydraulic actuator and more particularly relates to a float mode option to be used in conjunction with a control valve of the type disclosed in copending U.S. application Ser. No. 455,584, filed by the applicants of the instant case on Mar. 28, 1974.

Extensible and retractable hydraulic actuators are often used for positioning elements such as loader buckets or scraper blades which are brought into contact with the ground. In some instances, it may be desired to have the controlled element follow undulations of the ground and this may be done by simultaneously connecting both work ports or the actuator or actuators used to position the element to a reservoir to establish a condition which is commomly called a "float" condition.

Direction control valves presently in use which are capable of establishing a float condition in an extensible and retractable actuator usually require relatively complex valving and porting to accomplish the condition.

SUMMARY OF THE INVENTION

According to the present invention, there is provided a novel direction control valve of the pilot-operated poppet type disclosed in the above-identified U.S. application Ser. No. 455,584, but including an add-on option for establishing a condition in the valve for establishing a float condition in an extensible and retractable hydraulic actuator.

It is a broad object of the invention to provide a control valve which may optionally be provided with structure for establishing a float condition in an extensible and retractable actuator, the optional structure being simple in nature.

A more specific object of the invention is to provide a valve having porting which remains the same whether or not the valve includes structure for permitting it to effect a float condition in an extensible and retractable actuator.

A more specific object of the invention is to provide a valve having a housing including a cover in which is mounted piston means for actuating the valve so as to effect a float condition in an actuator controlled by the valve.

These and other objects will become apparent from a reading of the ensuing description in conjunction with the appended drawing.

DESCRIPTION OF THE PREFERRED EMBODIMENT

Figure 1:
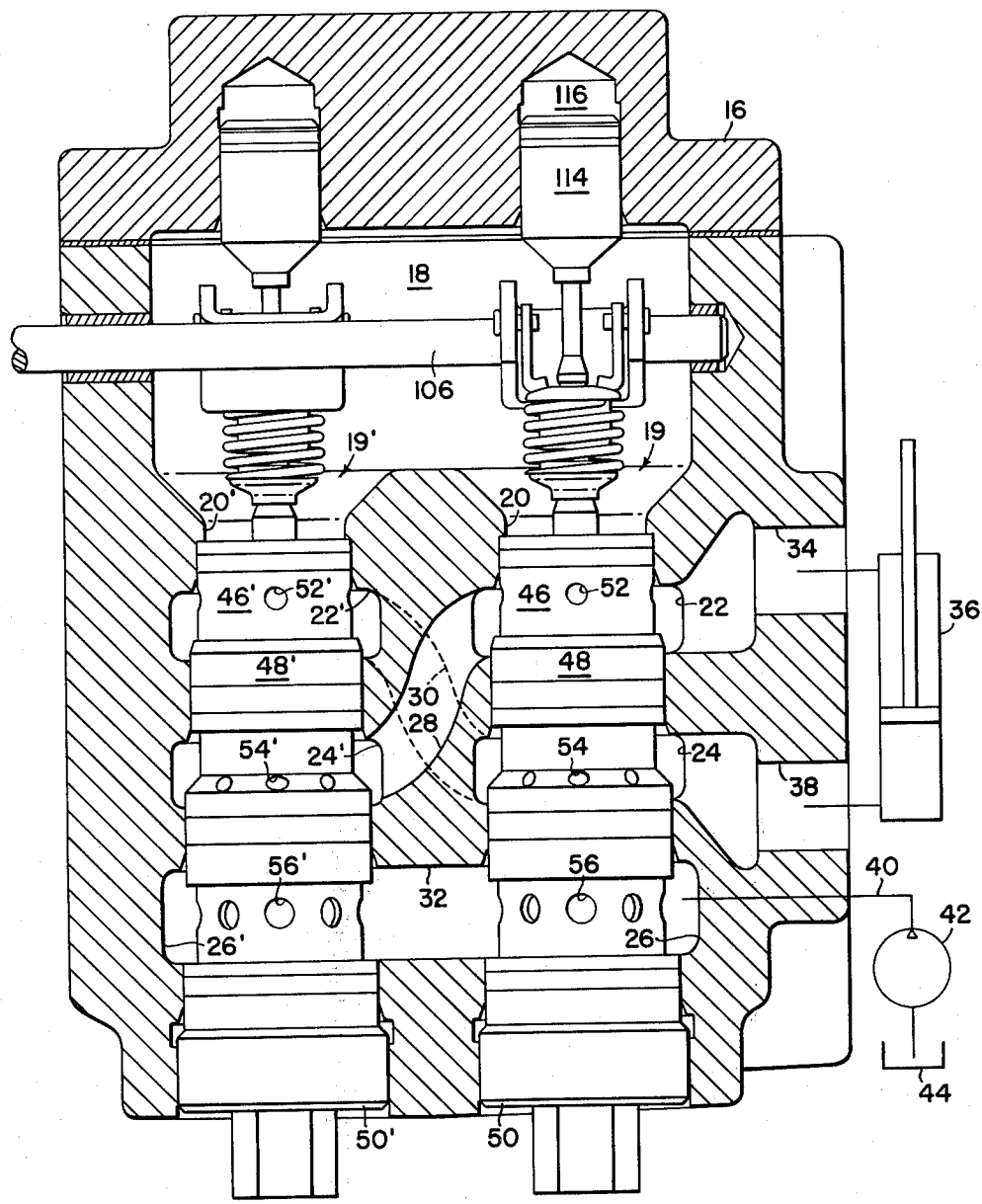
FIG. 1 is a mixed sectional and schematic view showing a part of the control valve of the present invention in longitudinal crossection and schematically representing the connection of the control valve with a sump and an extensible and retractable hydraulic actuator.

Referring now to FIG. 1, therein is shown a fluid system embodying a direction control valve constructed according to the principles of the present invention, the fluid system being indicated in its entirety by the reference numeral 10. The fluid system 10 includes a directional control valve 12 comprising a valve housing 14 including a removable cover or top section 16. The housing 14 and cover 16 cooperate to define a cavity which serves as a reservoir 18. Extending vertically in the valve housing below the reservoir 18 are identical right and left valve assemblies 19 and 19'The right and left valve assemblies 19 and 19' respectively include bores 20 and 20' respectively having upper ends opening into the reservoir 18. The bores 20 and 20' respectively include top, intermediate and bottom annular recesses 22 and 22', 24 and 24', and 26 and 26'. The top and intermediate recesses 22 and 24 of the bore 20 are respectively connected to the corresponding intermediate and top recesses 22' and 24' of the bore 20' by means of cross passages 28 and 30, respectively, while the bottom recess 26' 26 is connected to a corresponding recess of the left bore 19' through means of a passage 32. An upper control port 34 is in fluid communication with the top recess 22 and is connected to a first work port of an extensible and retractable hydraulic actuator 36 while a lower control port 38 is in fluid communication with the intermediate recess 24 and is connected to a second work port of the actuator 36. A pressure inlet port shown schematically at 40 is in fluid communication with the bottom recess 26 and is connected to the output of a pump 42, the inlet of the pump 42 being connected to a reservoir 44.

Respectively tightly fitted in end-to-end relationship in the bores 20 and 20' are top, intermediate and bottom sleeves 46 and 46', 48 and 48', and 50 and 50', respectively. The sleeves 46, 48 and 50 are respectively provided with sets of apertures 52 and 52', 54 and 54', and 56 and 56' which connect the respective interiors of the sleeves to the recesses 22 and 22', 24 and 24', and 26 and 26'. For the sake of simplicity and brevity only the details of the right valve assembly 19 are disclosed and described hereinafter. Specifically, the valve assembly 19 includes a valve stem 58 having a poppet valve element 60 axially shiftably mounted on the lower end thereof and kept from falling off the lower end of the valve stem through means of a retaining collar 62 seated against a snap ring (not shown), the collar 62 having a stack of shims 64 located between it and the poppet valve element 60.

The valve element 60 is dimensioned for slidably engaging the inner wall surface of the bottom sleeve 50 and, for the purpose of preventing leakage across the valve element, it is provided with an annular groove in which is located a split sealing ring 66 having a small gap 67 between opposite ends thereof. Only that peripheral portion of the valve element 60 which is above the sealing ring is in sliding engagement with the sleeve 50 and it is provided with an opening (not shown) leading to the groove in which the sealing ring 66 is located. Thus, a restricted fluid passage is provided across the valve element 60. In the neutral condition of the valve shown, the fluid pressure at the opposite sides of the valve element 60 is equal. However, the axially projected area at the bottom of the element is larger than the axially projected area at the top of the element, resulting in a net upward fluid force acting on the element. This force acts together with a coil compression spring 68 mounted between a shoulder defined by a bottom portion of the bottom sleeve 50 and the bottom surface of the valve element 60 to urge the latter upwardly to bring an upward facing conical seating surface 70 thereof into seating engagement with a valve seat defined by a lower edge of an opening 72 located at the bottom of the intermediate sleeve 48. Slidably mounted on the valve stem 58 at the opposite end of the opening 72 from the valve element 60 is a load check valve element 74 which has a downwardly facing conical seating surface biased into engagement with the upper end of the opening 72 through means of a coil compression spring 76 compressed between the check valve element 74 and a seal arrangement (not shown) fixed to the valve stem 58. The seal assembly is located within and is sealingly engaged with the interior of a sleeve-like pressure equalizing valve element 80 which is axially shiftably received in the intermediate sleeve 48. The inside diameter of the upper portion of the intermediate sleeve 48 is larger than the inside diameter of the lower portion of the sleeve and the valve element 80 has an enlarged upper end sized for engaging the upper portion of the sleeve. When the pressure equalizing valve element 80 is in a normal upper open position as illustrated, an annular space 82 is present beneath the enlarged upper end of the valve element and while not discernible from the drawing, the upper end of the valve element 80 is dimensioned such that there is sufficient clearance between it and the inner wall of the sleeve to permit the flow of fluid to and from the space 82. The respective effective areas of the top and bottom of the pressure equalizing valve element 80 exposed to fluid pressure are the same and the valve element 80 is dimensioned such that when the pressure acting on the top end of the valve element 80 is greater than the pressure acting upon the bottom end thereof, it will shift downwardly and block the ports 54. Thus, the valve element 80 will shift downwardly only when the pressure acting on the top thereof is greater than system pressure.

Flow between the upper control port 34 and the reservoir 18 is controlled through means of a poppet valve element 84. The valve element 84 includes an upwardly facing conical seating surface 86 disposed for engagement with a valve seat 88 defined by a shoulder at the open upper end of the top sleeve 46. For the purpose of normally maintaining the poppet valve element 84 against the valve seat 88 there is provided a coil compression spring 90 which acts between the lower end of the valve element 84 and the upper end of the seal arrangement (not shown) located inside the valve element 80. So that the poppet valve element 84 will be unseated by downward movement of the valve stem 58, a snap ring 92 is carried by the valve stem and is disposed for engaging the valve element 84.

Simultaneous unseating of the poppet valve elements 60 and 84 is accomplished by a pilot operation for imposing a pressure drop across the piston-like poppet valve element 60 to cause the latter to be pressure-shifted downwardly resulting in downward movement of the valve stem 58 and downward movement of the valve element 84. For the purpose of initiating flow across the valve element 60, the valve stem 58 is provided with a central passage 94 having its lower end in fluid communication with the space beneath the valve element 60 and having cross ports 96, at its upper end, which extend through the outer surface of the valve stem 58. A collar 98 is shiftably mounted on the upper end of the valve stem 58 and, when the valve is in the neutral condition illustrated, the collar 98 is held in blocking relationship to the cross ports 96 through means of a coil compression spring 100 which acts between a shoulder on the collar 98 and a shoulder on an element 102 located below the collar 98 and forming part of the valve stem 58. Leakage between the collar 98 and the stem 58 is prevented by poppet surface 104 formed on the upper portion of the valve stem 58 for normal seating engagement with the top inner portion of the collar 98.

For the purpose of selectively shifting the collar 98 downwardly so as to place the cross ports 96 in fluid communication with the reservoir 18, there is provided a control rod 106 located in the reservoir 18 and rotatably mounted in the walls of the valve housing 14. The control rod 106 includes a yoke-shaped arm 108 having an open bottomed, cup-like member 110 pivotally connected thereto as at pins 112 and seated against the top of the collar 98. Thus, it will be appreciated that upon clockwise rotation of the control rod 106, as viewed from its left end, the member 110 will be urged downwardly to cause downward movement of the collar 98 resulting in the uncovering of the cross ports 96. Once the cross ports 96 are uncovered, the space below the piston-like poppet valve element 60 will be connected to the reservoir 18 through the central passage 94 and flow will occur across the valve element 60 as permitted by the restricted passage therethrough. Since the flow across the valve element 60 is restricted, a pressure drop will occur thereacross resulting in the valve element 60 being pressure-shifted downwardly against the force of the compression spring 68. Downward movement of the valve element 60 will be transferred to the valve stem 58 and to the upper poppet valve element 84 through means of the snap ring 92. When the piston-like valve element 60 moves downwardly, the conical seating surface 70 thereof will become unseated from the lower edge of the opening 72 to thus place the bottom end of the load check valve 74 in fluid communication with system pressure supplied by the pump 42. When this occurs, the pressure will unseat the check valve 74. If the pressure at the lower control port 38 is equal to or less than the system pressure, the sleeve-like pressure equalizing valve element 80 will remain in its upper open position shown in FIG. 1 to thus permit fluid pressure to enter the lower work port of the hydraulic actuator 36, the upper work port thereof being connected to the reservoir 18 since the unseating of the poppet valve element 84 opens a passageway between the reservoir and the upper control port 34. It will be appreciated, that a similar actuation of the left valve assembly 19', independently of actuation of the right valve assembly 19, will result in the connection of the upper work port of the hydraulic actuator 36 to the pump 42 and connection of the lower work port of the actuator to the reservoir 18. Thus, the structure heretofore described makes it possible to place the hydraulic actuator 36 in a neutral condition wherein both work ports thereof are blocked from the reservoir 18 and the pump 42, a first pressure condition wherein the lower work port of the actuator is connected to the pump 42 while the upper work port is connected to the reservoir 18 and a second pressure condition wherein the lower work port of the actuator is connected to the reservoir 18 while the upper work port is connected to the pump 42.

For the purpose of actuating the hydraulic actuator 36 to a float condition, wherein both the upper and lower work ports thereof are simultaneously connected to the reservoir 18, the right and left valve assemblies each include an actuator mounted in the valve cover 16. Specifically, the right actuator includes a hydraulically shiftable piston 114 mounted in the valve cover 16 and disposed in axial alignment with and engaged with the top of the valve stem 58. Thus, with the right valve assembly being in the neutral position shown, pressurization of a space 116 located above the piston 114 will cause the piston to be shifted downwardly to cause attendant downward shifting movement of the valve stem 58. This movement will have no effect of the poppet valve element 60, which will remain seated, however, the movement will be transferred to the poppet valve element 84 by the snap ring 92 to unseat the valve element 84 and connect the upper work port of the actuator 36 to the reservoir 18. It will be appreciated, that simultaneous similar operation of the left valve assembly 19' will result in the lower work port of the actuator 36 being connected to the reservoir 18.

Figures 2, 3:
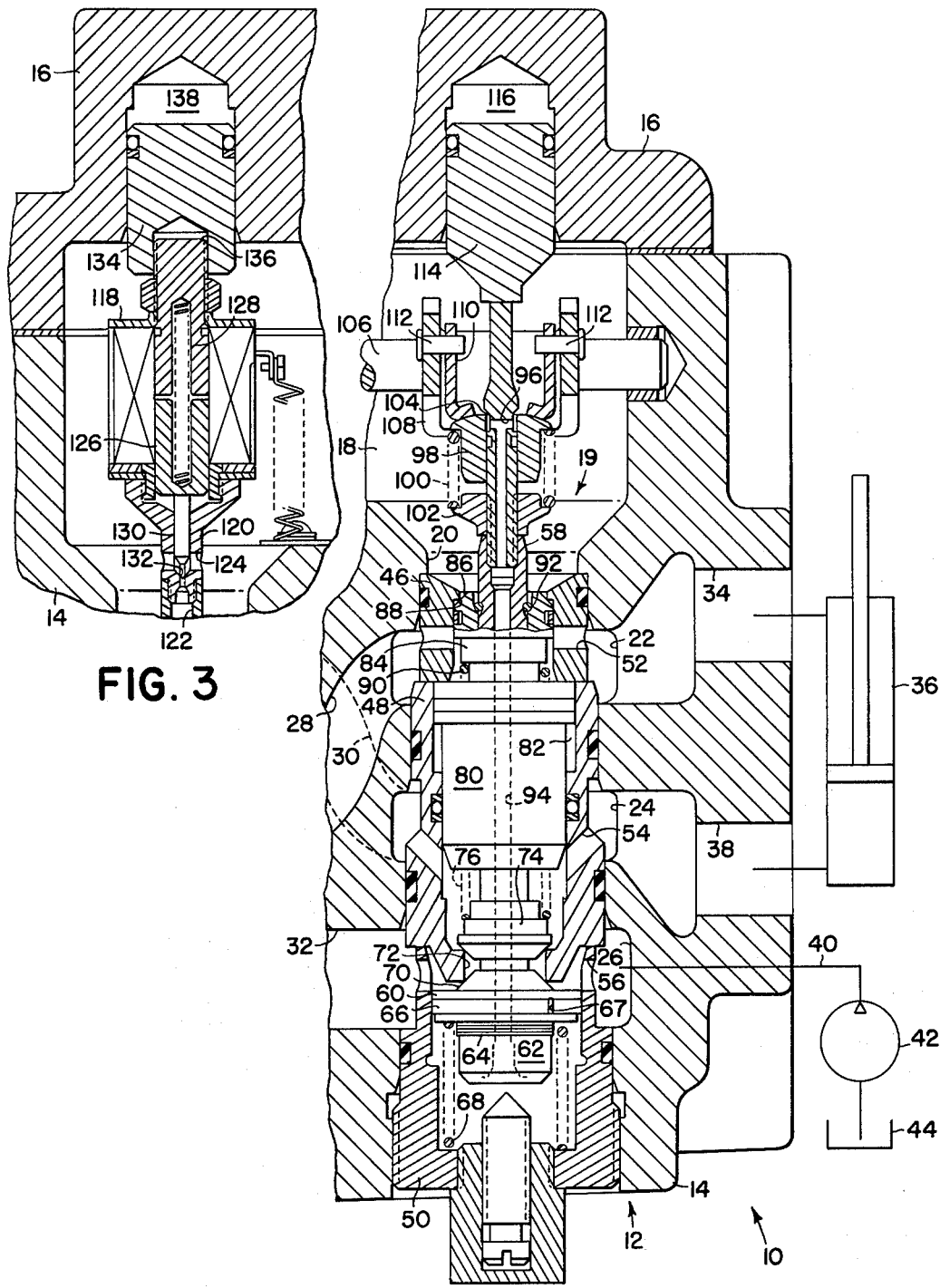
FIG. 2 is a view showing details of the right valve assembly disclosed in FIG. 1.
FIG. 3 is a sectional view showing a modification of the valve of FIGS. 1 and 2.

Referring now to FIG. 3, therein is shown an embodiment wherein an electrical control is used to initiate pilot operation of the valve instead of a mechanical control such as the control rod 106. It is to be understood that except for the portions to be described, the valve disclosed in FIG. 3 is identical to the one disclosed in FIG. 1 and like parts are given the same reference numerals. Specifically, the valve in FIG. 3 includes a solenoid 118 which is mounted to the top of a valve stem 120 having a pilot passage 122 which serves the same purpose as the passage 94 in the valve stem 58 and which includes cross ports 124 at its upper end. For the purpose of controlling the flow of fluid through the cross ports 124, the solenoid 118 includes a plunger 126 which is biased downwardly by a spring 128. The spring 128 acts through the plunger to urge a valve pin 130 into engagement with a valve seat 132 formed in the passage 122 just below the cross ports 124. A hydraulically operated piston 134 is mounted in the housing cover 16 in axial alignment with the valve stem 120 and has a receptacle 136 formed in its lower end and an upper end portion of the solenoid 118 is received in the receptacle 136.

Upon energization of the solenoid 118, the plunger 126 will move upwardly and pressure in the pilot passage 122 will unseat the valve pin 130 to permit flow from the bottom of the bore 20 in the same manner as described above with reference to the valve shown in FIG. 1. Further, it can be seen that by pressurizing the space 138 above the piston 134, the piston will be moved downwardly to cause downward movement of the solenoid 118 and the valve stem 120 so as to effect a float condition in an extensible and retractable actuator in a manner similar to that described with reference to the valve 12 in FIG. 1.

Thus, it will be appreciated that applicant's basic valve structure for controlling an extensive and retractable hydraulic actuator for effecting neutral and first and second active conditions therein can be easily converted to a structure for effecting a float condition in the actuator without modification of the valving and porting of the basic valve. Specifically, applicant's basic valve, as illustrated in copending U.S. application Ser. No. 455,584 can be converted to the valve structure of the present application by merely substituting a different valve cover and a slightly different valve piston.

The operation of the control valve illustrated in FIGS. 1 and 2 and its modification shown in FIG. 3 are thought to be clear from the discussion above and for the sake of brevity, no further description is given.

We claim:

1. In a hydraulic control valve of a type including first and second identical valve assemblies, each valve assembly including a valve stem axially shiftably mounted in a valve bore means, first and second valve elements mounted on the valve stem at axially spaced locations thereof for cooperating with and controlling the flow of fluid across first and second valve seats formed by the bore means at respective locations between first and second ports thereof, respectively adapted for connection to a source of fluid pressure and a respective actuator work port, and between a third work port and a first location thereof, respectively adapted for connection to a respective actuator work port and a reservoir; and the first, second and third ports and first location of the bore means of the first valve assembly being respectively connected to the first, third and second ports of the bore means of the second valve assembly, the improvement comprising: each of the first and second valve assemblies including first and second mounting means respectively connecting the first and second valve elements on the valve stem thereof such that axial movement of the first valve element in a first direction will unseat the first valve element and cause concurrent movement of the valve stem and unseating of the second valve element while movement of the valve stem in said first direction will leave the first valve element undisturbed while unseating the second valve element; first actuating means for selectively shifting said first valve elements of the first and second valve assemblies in said first direction; and second actuating means exclusive of said first actuating means, for simultaneously shifting each of the valve stems of the first and second valve assemblies in said first direction.

2. The control valve defined in claim 1 wherein said second actuating means includes first and second pistons in operative association with the respective valve stems of the first and second valve assemblies and simultaneously actuatable to effect concurrent shifting of the valve stems.

3. In a direction control valve of a type including a valve body defining identical first and second valve bore means having respective closed ends, first and second valve stems respectively axially shiftably mounted in the first and second valve bore means and each having first and second poppet valve elements mounted thereon for movement therewith towards and away from the closed ends of the bore means to respectively become unseated and seated with first and second valve seat means located at axially spaced locations in each bore in positions so located relative to connections of the bores with each other and with pressure, first control, second control and exhaust ports of the valve body that when both poppet valve elements in the first bore are unseated, the pressure and first control port are interconnected and the exhaust and second control ports are interconnected and when both poppet valve elements in the second bore means are unseated, the pressure and second control ports are interconnected and the exhaust and first control ports are interconnected, the improvement comprising: said first poppet valve elements being respectively located in the first and second bore means for movement between the closed ends of the bore means and respective connections of the latter with the pressure port, each of said first poppet valve elements being mounted on a respective valve stem by first mounting means permitting the valve stem to move relative to the associated first poppet valve element in the direction of the closed end of a respective bore means; each of said second poppet valve elements being mounted on a respective valve stem by second mounting means causing the second poppet valve elements to be shifted together with the associated valve stem when the latter is shifted towards the closed end of an associated bore means; and actuator means being in operative association with each valve stem and operable for causing concurrent movement of both valve stems in the direction of the closed ends of the first and second bore means.

4. In a control valve for controlling the operation of an extensible and retractable hydraulic actuator, the valve being of a type including a valve body defining first and second valve bore means having respective closed first ends and having respective second ends in fluid communication with a fluid reservoir, each of said bore means being intersected by axially spaced supply and first and second control ports located serially in that order from the closed first ends of the bore means, a first passage means interconnecting the supply ports and adapted for connection to a source of fluid pressure, a second passage means interconnecting the first control port of the first bore means with the second control port of the second bore means and adapted for connection to a first actuator work port, a third passage means interconnecting the second control port of the first valve bore means with the first control port of the second bore means and adapted for connection to a second actuator work port, said first and second bore means each having first and second valve seat means facing the closed ends thereof and located between the supply and first control ports thereof and between the second control ports and second ends thereof, first and second valve stems respectively axially shiftably mounted in the first and second bore means, first and second poppet valve elements mounted on each of the valve stems and respectively biased towards engagement with the first and second valve seat means, each of said valve stems having a fluid passage therein having first open ends in fluid communication with the closed ends of the bore means and having second open ends adapted for fluid communication with said reservoir, each of said first poppet valve elements having a metering orifice means therein defining sole means placing the supply ports in fluid communication with the closed end of the bore means, first and second closure means respectively axially shiftably mounted on each of said valve stems for movement between closed and open positions respectively wherein they block and connect said second open ends of the fluid passage of the valve stems from and in fluid communication with the reservoir, the improvement comprising: said first and second poppet valve elements being axially shiftably mounted on their respective valve stem; each of said first and second stems having first and second abutment means located thereon so as to respectively move away and towards engagement with respective ones of the first and second poppet valve elements when the valve stem is shifted towards the closed end of the bore in which it is mounted; and actuator means operatively associated with said first and second valve stems for causing concurrent shifting of the latter in the direction of the respective closed ends of the first and second bores so as to effect simultaneous unseating of the second poppet valve elements to thereby establish a condition adapted for simultaneously connecting both work ports of an actuator to the reservoir.

* * * * *